(12) United States Patent
Brück et al.

(10) Patent No.: US 8,281,573 B2
(45) Date of Patent: Oct. 9, 2012

(54) EVAPORATION UNIT FOR PRODUCING GASEOUS AMMONIA AND DEVICE AND MOTOR VEHICLE HAVING AN EVAPORATION UNIT

(75) Inventors: Rolf Brück, Bergisch Gladbach (DE); Christian Vorsmann, Köln (DE); Sven Schepers, Troisdorf (DE); Jan Hodgson, Troisdorf (DE); Marc Brugger, Neunkirchen (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 58 days.

(21) Appl. No.: 12/870,954

(22) Filed: Aug. 30, 2010

(65) Prior Publication Data

US 2011/0041484 A1 Feb. 24, 2011

Related U.S. Application Data

(63) Continuation of application No. PCT/EP2009/050901, filed on Jan. 28, 2009.

(30) Foreign Application Priority Data

Feb. 29, 2008 (DE) .......................... 10 2008 012 087
May 16, 2008 (DE) .......................... 10 2008 023 938

(51) Int. Cl.
*F01N 3/00* (2006.01)
*F01N 3/10* (2006.01)
(52) U.S. Cl. ............... 60/286; 60/295; 60/301; 422/173

(58) Field of Classification Search .............. 422/173, 422/174, 183, 187, 208; 60/286, 295, 301
See application file for complete search history.

(56) References Cited

U.S. PATENT DOCUMENTS

| | | | |
|---|---|---|---|
| 4,325,781 A | 4/1982 | Proske et al. | |
| 2003/0188855 A1 | 10/2003 | Maeda et al. | |
| 2004/0105789 A1 | 6/2004 | Yamamoto | |
| 2008/0230184 A1 | 9/2008 | Eigenberger et al. | |
| 2009/0127511 A1 * | 5/2009 | Bruck et al. .................. | 252/372 |

FOREIGN PATENT DOCUMENTS

| | | |
|---|---|---|
| DE | 3024927 A1 | 2/1981 |
| DE | 40 29 260 C1 | 5/1992 |
| DE | 10 2005 023 956 A1 | 11/2006 |
| JP | 2000320997 A * | 11/2000 |
| WO | WO 2007131784 * | 11/2007 |

OTHER PUBLICATIONS

International Search Report of PCT/EP2009/050901, Dated Jul. 27, 2009.

* cited by examiner

*Primary Examiner* — Kenneth Bomberg
*Assistant Examiner* — Abdul Elnoubi
(74) *Attorney, Agent, or Firm* — Laurence A. Greenberg; Werner H. Stemer; Ralph E. Locher

(57) ABSTRACT

An evaporation unit for producing a gas flow including ammonia, in particular in connection with an SCR system in motor vehicles, includes at least a housing, at least one meandering flow channel delimited by a closed wall and having an inlet and an outlet and at least one heat conductor disposed in a first evaporation section of the at least one flow channel coaxially between the housing and the wall. A device and a motor vehicle having the evaporation unit are also provided.

18 Claims, 4 Drawing Sheets

EVAPORATION UNIT FOR PRODUCING GASEOUS AMMONIA AND DEVICE AND MOTOR VEHICLE HAVING AN EVAPORATION UNIT

CROSS-REFERENCE TO RELATED APPLICATION

This is a continuation, under 35 U.S.C. §120, of copending International Application No. PCT/EP2009/050901, filed Jan. 28, 2009, which designated the United States; this application also claims the priority, under 35 U.S.C. §119, of German Patent Application Nos. DE 10 2008 012 087.1, filed Feb. 29, 2008, and DE 10 2008 023 938.0, filed May 16, 2008; the prior applications are herewith incorporated by reference in their entirety.

BACKGROUND OF THE INVENTION

Field of the Invention

The present invention relates to an evaporation unit for producing a gas flow including ammonia. An evaporation unit of that type is used, in particular, for providing gaseous ammonia from an ammonia precursor, in particular in liquid and/or solid form. The invention is also used, in particular, within the context of exhaust-gas aftertreatment in motor vehicles and therefore includes a device and a motor vehicle having an evaporation unit.

In diesel internal combustion engines, in particular, it has proven to be expedient for urea in aqueous solution to be added directly to the exhaust gas produced by the engine, or for ammonia to be added to the exhaust gas after a hydrolysis carried out outside the exhaust gas. In that case, in known methods, use is made of a hydrolysis catalytic converter in which ammonia is gained from the urea. The aqueous urea solution is added upstream of the hydrolysis catalytic converter, changed into the gaseous state and placed in contact with the hydrolysis catalytic converter. The ammonia generated in that case then reacts, for example in a so-called SCR catalytic converter further downstream in the exhaust-gas flow, with nitrogen oxides contained therein to form molecular nitrogen and water.

Temperature control during the evaporation of the aqueous urea solution is particularly difficult. That should be taken into consideration specifically from the aspect that firstly the required quantities of urea solution and secondly the available temperatures can vary significantly in a mobile application. If only incomplete evaporation is obtained, intermediate products can form which can possibly lead to blockage of the evaporator unit. Such undesired secondary products are, for example, water-insoluble biuret, which is formed from isocyanic acids and urea, and cyanuric acid, which is the trimerization product of the isocyanic acids. During the evaporation of an ammonia precursor, in particular of a liquid urea-water solution, it has been observed that the introduction of temperature into the liquid must take place very quickly over a critical temperature range in order to prevent the formation of the undesired, partially no longer removable compounds.

Devices have already been described for the evaporation, outside the exhaust gas, of a urea-water solution, but those devices have heretofore been unconvincing at least for use in the automotive field. In that case, the known evaporation devices in part cannot guarantee the desired completeness of evaporation over all of the operating states and/or quantities of the ammonia precursor to be evaporated. That applies, in particular, in the event of highly dynamic regulation of the evaporation unit taking into consideration operating states of a mobile internal combustion engine, such as for example a diesel engine.

SUMMARY OF THE INVENTION

It is accordingly an object of the invention to provide an evaporation unit for producing gaseous ammonia and a device and a motor vehicle having an evaporation unit, which overcome the hereinafore-mentioned disadvantages of and at least partially solve the problems highlighted with regard to the heretofore-known units, devices and vehicles of this general type. In particular, it is intended to specify an evaporation unit which provides, in a highly dynamic manner, a fast and complete evaporation of a urea-water solution for producing a gas flow including ammonia in exactly predefined quantitative amounts. In this case, the evaporation unit should have a compact and simple construction. It should also be possible for the evaporation unit to be produced cost-effectively.

With the foregoing and other objects in view there is provided, in accordance with the invention, an evaporation unit for producing a gas flow including ammonia. The evaporation unit comprises a housing, at least one meandering flow channel having an inlet, an outlet, a first evaporation section and a closed wall delimiting the at least one flow channel, and at least one heat conductor disposed at least in the first evaporation section of the at least one flow channel coaxially between the housing and the wall.

The evaporation unit preferably has a very compact construction and, for example, a tubular shape. The external dimensions of an evaporation unit of that type are, for example, a length of approximately 400 mm and a diameter in a region of 50 mm. The evaporation unit is therefore suitable, in particular, for being part of a line section of an exhaust system of a mobile internal combustion engine and/or part of a line section of an auxiliary system which opens into the exhaust line.

The housing is generally formed from a steel material. It is particularly preferable for the housing to be a steel tube. High-temperature resistance and/or particularly high corrosion resistance is not imperatively necessary for the housing, because the evaporation unit is generally disposed outside those regions of the exhaust system through which exhaust gas flows, and which are consequently hot.

The flow channel has a "meandering" construction. This means firstly (merely) that a non-rectilinear profile of the flow channel is realized. It is very particularly preferable for the flow channel to have a periodic change in profile about a central axis of the flow channel or of the evaporation unit. The meandering profile is described in particular by a corrugated profile. The number of flow channels may be selected corresponding to the desired conditions and an embodiment with a single meandering flow channel is preferable. It is, however, also possible if appropriate for at least one further flow channel (which can, for example, be activated as required) to be provided (for example for the provision of a relatively high amount of ammonia gas).

With regard to the inlet, it should be noted that it can generally be connected to a pump and/or a reservoir, that is to say it conducts the ammonia precursor (for example urea-water solution) into the evaporation unit or into the meandering flow channel. The outlet is then generally provided on the opposite side, from which outlet (practically pure) ammonia gas leaves the flow channel. The flow channel is generally delimited by a single, closed and in particular separate wall.

The wall ensures that the ammonia precursor which is supplied is completely evaporated and emerges at the outlet again.

Furthermore, at least one heat conductor is provided. The heat conductor is in particular an electrical heat conductor which reaches high temperatures quickly and on demand. It is preferable for (only) a heat conductor to be provided in the evaporation section, although it is also possible, if appropriate, to provide (for a certain region) a further heat conductor configuration or a plurality of further heat conductors. Furthermore, the heat conductor runs axially with respect to the flow channel. This means, in particular, that the heat conductor is disposed in the manner of loops, a coil or the like around the flow channel. For this purpose, the heat conductor should be provided, if appropriate, with a corresponding current or voltage supply. Accordingly, electrical connections should be provided on the evaporation unit, which electrical connections should be connected, if appropriate, to a suitable controller. In this case, the heat conductor is supplied with current (intermittently) and, due to ohmic resistance heating, generates heat which is also transmitted (indirectly) to the flow channel or the wall thereof. Through the use of the configuration of a plurality of heat conductors in the at least one first evaporation section, it is possible to purposely manipulate the temperature of the gas flow to be produced within the flow channel.

The very compact construction permits, through the use of the positioning of the heat conductor, a fast introduction of the heat and therefore a particularly fast temperature increase in the meandering flow channel through which the ammonia precursor is conducted.

In accordance with another feature of the invention, the closed wall is formed by a tube including titanium. This is, in particular, a small tube which is composed substantially of titanium (for example more than 90% by weight of titanium), into the wall of which is formed a corrugated structure, wherein the corrugated structure may be present at the inside and/or outside. In this case, the tube is provided, for example, with a diameter of less than 6 mm.

In accordance with a further feature of the invention, the wall is at least partially provided with a hydrolysis coating. The hydrolysis coating is formed so as to promote the hydrolysis of urea to form ammonia. Porous coatings, oxides and/or salts may be used for this purpose. If the wall of the flow channel is formed with titanium, it is proposed, in particular, that titanium oxide be provided on the wall, in such a way that the titanium oxide comes into contact with the ammonia precursor and promotes the conversion of urea-water solution to form ammonia. Merely for the sake of completeness, it is pointed out that the hydrolysis coating may be provided only in a part of the first evaporation section.

In accordance with an added feature of the invention, the at least one heat conductor is disposed so as to be spaced apart from the housing and the at least one flow channel at least in the first evaporation section. This also means, in other words, that devices are provided which fix the heat conductor at a spacing both from the housing and also from the at least one flow channel. In this case, the spacing may also vary within an evaporator section in the flow direction of the ammonia precursor. The heat conductor may be positioned, for example, closer to the housing at one point and closer to the flow channel at another point. Through the use of the spacing of the heat conductor from the flow channel, it is likewise possible to purposely manipulate the temperature profile in the flow channel, wherein at the same time an intensive connection to one of the two components can be prevented, which can possibly yield advantages with regard to the servicing or maintenance of such heat conductors.

In accordance with an additional feature of the invention, at least the at least one flow channel or the at least one heat conductor is cast into a basic body which includes at least aluminum or copper. In particular, the basic body (which may if appropriate be constructed from a plurality of parts) may be formed with a casing/housing composed of aluminum and copper components situated therein. It is preferable for both elements to be cast in a (single) basic body. The casting of the heat conductor and flow channel (for example the wall of the flow channel) results in particularly good heat conduction from the heat conductor to the flow channel. Aluminum as a material for the basic body has the advantage that the material is particularly easy to cast and has excellent heat conductivity. At the same time, the weight of the evaporation unit is kept low, which is always an important aim in automobile construction.

The basic body may, in particular, also serve as a device for spacing apart the heat conductor from the housing and the flow channel. In particular, it is possible for a structured or meandering titanium tube to be encapsulated (basic body) with aluminum, copper and/or some other heat-conductive material with a lower melting point than titanium. In this way, it is in particular possible again to generate a tube-like body with a "smooth" outer wall. A path for the at least one heat conductor can then be formed into the outer wall, for example in the manner of a thread or the like. The heat conductor can then be positioned in the path (for example in the manner of a groove) and connected (for example soldered or brazed) to the basic body.

In accordance with yet another feature of the invention, at least the flow channel or the at least one heat conductor is disposed in a basic body including copper granulate. In particular, the flow channel and the at least one heat conductor are disposed in a housing (composed, for example, of aluminum) and fixed by the copper granulate. The copper granulate is, in particular, compacted, in such a way that adequate contacting of the at least one heat conductor and the wall of the flow channel is ensured, and a corresponding exchange of heat takes place. The compaction of the copper granulate also leads, in particular, to a homogeneous distribution of the copper granulate, and thereby permits a uniform exchange of heat from the heat conductor to the flow channel. The use of copper granulate, in particular, uses less energy, and can be carried out more simply in terms of a process, than the casting of the heat conductor and of the flow channel in a basic body. It is therefore not necessary to check for cavities and other inhomogeneities of the cast body. Even though copper granulate is fundamentally preferable in this case, it is likewise possible to additionally and/or alternatively use granulates of other materials (such as for example aluminum) which permit a similar conduction of heat from the heat conductor to the flow channel.

In accordance with yet a further feature of the invention, at least one thermal insulation is positioned between the housing and the at least one heat conductor. The thermal insulation includes, in particular, a material which prevents the propagation of the heat originating from the heat conductor to the housing (in particular in relation to the heat conduction to the basic body). Suitable materials in this case are, in particular, coatings and/or separate components which preferably include ceramic materials. In combination, or alternatively thereto, it is proposed that vacuum chambers be provided which likewise prevent a propagation of the heat.

In accordance with yet an added feature of the invention, it is considered to be advantageous for the evaporation unit to be formed with a first evaporation section and a second evaporation section and for at least the configuration, number or construction of at least one of the following elements to vary: meandering flow channel, heat conductor, wall, basic body, insulation. It is very particularly preferable for a multiplicity of the elements, in particular at least three elements, to differ between the first evaporation section and the second evaporation section. This means not only that a variation with regard to configuration, number or construction of the elements is present within the evaporation sections, but also that a variation may alternatively or additionally be provided in the intermediate region between the evaporation sections. With regard to the meandering flow channel, it is possible, in particular, for the number of flow channels used, the profile shape, the material forming the flow channel and/or the cross section of the flow channel to vary. With regard to the heat conductor, the heating power, the number of heat conductors, the spacing between the heat conductor and the flow channel and/or housing and/or the control of the heat conductor are considered to be variable. With regard to the wall, it is stated by way of example that in this case the material, coating and/or wall thickness may be adapted. The basic body may, for example, be formed with cavities, additional materials or the like in an evaporation section and/or between a plurality of evaporation sections. The insulation may also vary in the evaporation sections themselves and/or in the intermediate spaces, for example in terms of the number of insulating layers and/or the materials used therefor.

In accordance with yet an additional feature of the invention, it is also considered to be advantageous for the evaporation unit to be formed with a first evaporation section and a second evaporation section, with the first evaporation section and the second evaporation section being disposed parallel to one another and being connected to one another through a turning section. In the variant proposed in this case having a first evaporation section and a second evaporation section, it is sought to provide a particularly compact configuration. For this purpose, the flow channel runs adjacent itself, or in a parallel configuration, at least in one region. In this case, it should be noted that "parallel" need not be interpreted strictly in the mathematical sense. It is, in fact, important in this case merely that the flow channel runs adjacent itself in order specifically to enable the flow channel to be positioned in a space-saving manner in the evaporation unit and to also permit or promote, if appropriate, an exchange of heat between the two regions of the flow channel disposed adjacent one another. The two parallel evaporation sections are connected to one another through a turning or reversing section, which is formed, for example, in the manner of a semi-circular bend.

In this variant, it is particularly preferable for different heat conductors to be provided simultaneously. For example, it is considered to be advantageous for self-regulating PTC (positive temperature coefficient) elements to be used in the first evaporation section. The PTC elements are current-conducting materials which can conduct the current better at lower temperatures than at high temperatures. The electrical resistance increases with rising temperature. This also means in other words that the heating power likewise becomes lower with rising temperature. This can also in particular be influenced by the adjacent second evaporation section. The heat conductor which is disposed coaxially with respect to the flow channel is preferably provided in the second evaporation section. It may, if appropriate, also be possible for the turning section to be formed with the coaxially disposed heat conductor in order to obtain or maintain the desired temperatures in this case.

In accordance with again another feature of the invention, it is also proposed that at least one reactor chamber with a hydrolysis coating be provided adjacent the outlet of the at least one flow channel. This means in other words that an at least two-stage hydrolysis is preferably carried out in this case within the evaporation unit (outside the exhaust gas). If a plurality of evaporation sections is provided, a hydrolysis may take place in at least one evaporation section, but preferably in all of the evaporation sections and the reactor chamber. For this purpose, the reactor chamber may also have an increased number of flow channels, for example as a result of the provision of a honeycomb body integrated therein. A honeycomb body of this type is, in particular, formed with a multiplicity of at least partially structured metal foils. The metal foils are preferably provided with a hydrolysis coating. In this context, too, it is possible for titanium to be used as the main material.

With the objects of the invention in view, there is also provided a device, comprising at least one reservoir, a dosing pump, an evaporation unit according to the invention, and at least one line section at least partially interconnecting the at least one reservoir, the dosing pump and the evaporation unit.

Specifically, when using a urea-water solution, the reservoir constitutes a liquid tank. The dosing pump, which is positioned preferably between the reservoir and the evaporation unit, can supply the urea-water solution to the evaporation unit in particularly short time periods and with very high accuracy. The line section is preferably formed with an aluminum and/or steel tube. The device may additionally include sensors and/or an (electric) controller and/or valves.

With the objects of the invention in view, there is concomitantly provided a motor vehicle, comprising an internal combustion engine and an exhaust system having at least one SCR catalyst body and at least one connection to an evaporation unit according to the invention or to a device according to the invention. The at least one connection is disposed between the internal combustion engine and the at least one SCR catalyst body for conducting a gaseous ammonia flow into the exhaust system and to the at least one SCR catalyst body.

It is very particularly preferable in this case for no further valve to be provided between the outlet of the meandering flow channel, or if present the end of the reactor chamber, on one hand and the connection, port or exhaust system on the other hand. If appropriate, the connection or port may also be provided with a device for distributing the gas flow including ammonia which leaves the evaporation unit and which is supplied to the exhaust gas in the exhaust system.

The SCR catalyst body or catalytic converter body is conventionally made of a (ceramic, extruded) honeycomb body which has, for example, an SCR coating. An SCR coating of that type is preferably of the $V_2O_5/WO_3/TiO_2$ type (vanadium pentoxide/tungsten trioxide/titanium dioxide).

Other features which are considered as characteristic for the invention are set forth in the appended claims, noting that the features specified individually in the dependent claims can be combined with one another in any desired technologically meaningful way and present further embodiments of the invention.

Although the invention is illustrated and described herein as embodied in an evaporation unit for producing gaseous ammonia and a device and a motor vehicle having an evaporation unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
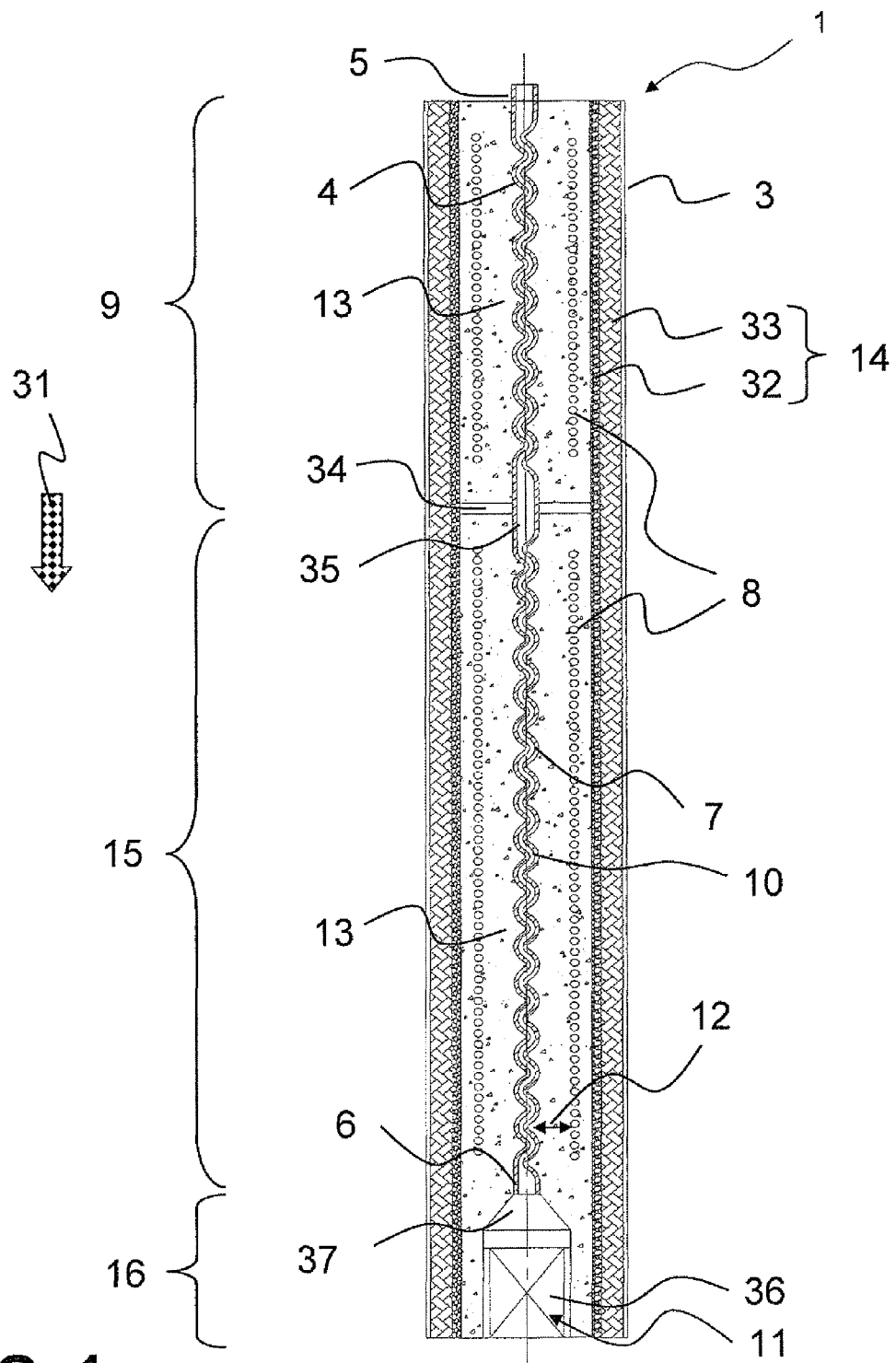
FIG. 1 is a fragmentary, diagrammatic, longitudinal-sectional view of a structural variant of an evaporation unit according to the invention.

Referring now in detail to the figures of the drawings, with which the technical field as well as embodiments that are not intended to restrict the invention will now be explained and in which the same reference numerals are used for identical objects, and first, particularly, to FIG. 1 thereof, there is seen a sectional view of a first particularly preferred structural variant of an evaporation unit 1. The evaporation unit 1 is delimited toward the outside by a tubular housing 3 composed of steel. The evaporation unit 1 can be divided into three (3) partial regions in a flow direction 31 of a fluid to be evaporated (for example a urea-water solution), specifically a first evaporation section 9, a second evaporation section 15 and a reactor chamber 16.

A central component of the evaporation unit 1 is a centrally disposed meandering flow channel 4 which is delimited by a wall 7 including a tube 10 composed of titanium. A corrugated profile of the flow channel 4 is realized in both evaporation sections 9, 15, through the use of the tube 10 composed of titanium. In this case, the urea-water solution enters, in particular, into an inlet 5 in liquid form and then passes through the first evaporation section 9.

The tube 10 is surrounded by a basic body 13 which is formed, in particular, from an aluminum material or a copper material. Both the tube 10 composed of titanium and a heat conductor 8, are cast into the basic body 13. The basic body 13, which has a cylindrical construction in this case, extends substantially over the length of the first evaporation section 9 and is delimited toward the outside by a ceramic layer 32. The ceramic layer 32 may, in particular, be formed with a ceramic powder. An additional ceramic tube 33 is provided further outward, between the ceramic layer 32 and the housing 3. The ceramic layer 32 and the ceramic tube 33 together form a thermal insulation 14. While the thermal insulation 14 and the housing 3 as well as the tube 10 composed of titanium are formed in one piece over the first evaporation section 9 and the second evaporation section 15, separate respective basic bodies 13 are provided in each of the first evaporation section 9 and the second evaporation section 15. Different heat conductors 8, if appropriate with separate connections, are likewise formed in this case.

Furthermore, a gap 34 is provided between the two basic bodies 13. The gap 34 constitutes a thermal insulation, in particular, in the axial direction. In this way, temperature profiles of the first evaporation section 9 and the second evaporation section 15 should, if appropriate, be regulable or adjustable separately from one another. The flow channel 4 also has a different construction in the transition region between the first evaporation section 9 and the second evaporation section 15, in this case specifically with a (widened, rectilinear) transition section 35. In the first evaporation section 9 and in the second evaporation section 15, a spacing 12 between the heat conductor 8 and the flow channel 4 is substantially equal.

In the region of an outlet 6 of the flow channel 4, the basic body 13 subsequently has a widening 37 into which the heretofore (nearly) completely evaporated urea-water solution expands. A honeycomb body 36, having a hydrolysis coating 11, follows the widening 37 in the reactor chamber 16. Gas which is converted completely to form ammonia then leaves the evaporation unit 1 and can flow into the exhaust system.

Figure 2:
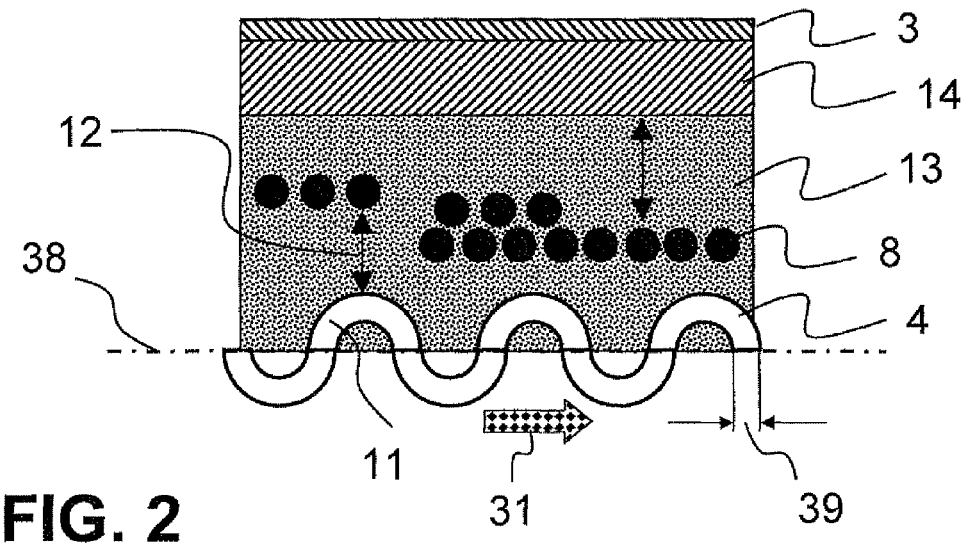
FIG. 2 is a fragmentary, longitudinal-sectional view of a further embodiment of an evaporation unit.

FIG. 2 shows details of a further embodiment of the evaporation unit 1 in a partial sectional view. The bottom of FIG. 2 illustrates the way in which the flow channel 4 weaves or oscillates regularly about a central axis 38. In this case, the flow channel 4 has a diameter 39 of, for example, 4 mm. Furthermore, a hydrolysis coating 11 is provided in the interior of the flow channel 4 or on the wall 7 thereof. The flow channel 4 is, however, cast into a basic body 13 in which the heat conductors 8 are also provided in the manner of a helical winding. In this case, a heat conductor 8, which is indicated in a left-hand region, is positioned at a certain spacing 12 from the flow channel 4. A plurality of heat conductors 8, which are provided further to the right, partially overlap and are, in particular, in a more tightly-packed configuration relative to one another, with a spacing 12 between the heat conductors 8 and the housing 3 or the thermal insulation 14 having been increased there in such a way that the heat conductors 8 are provided closer to the flow channel 4.

Figure 3:
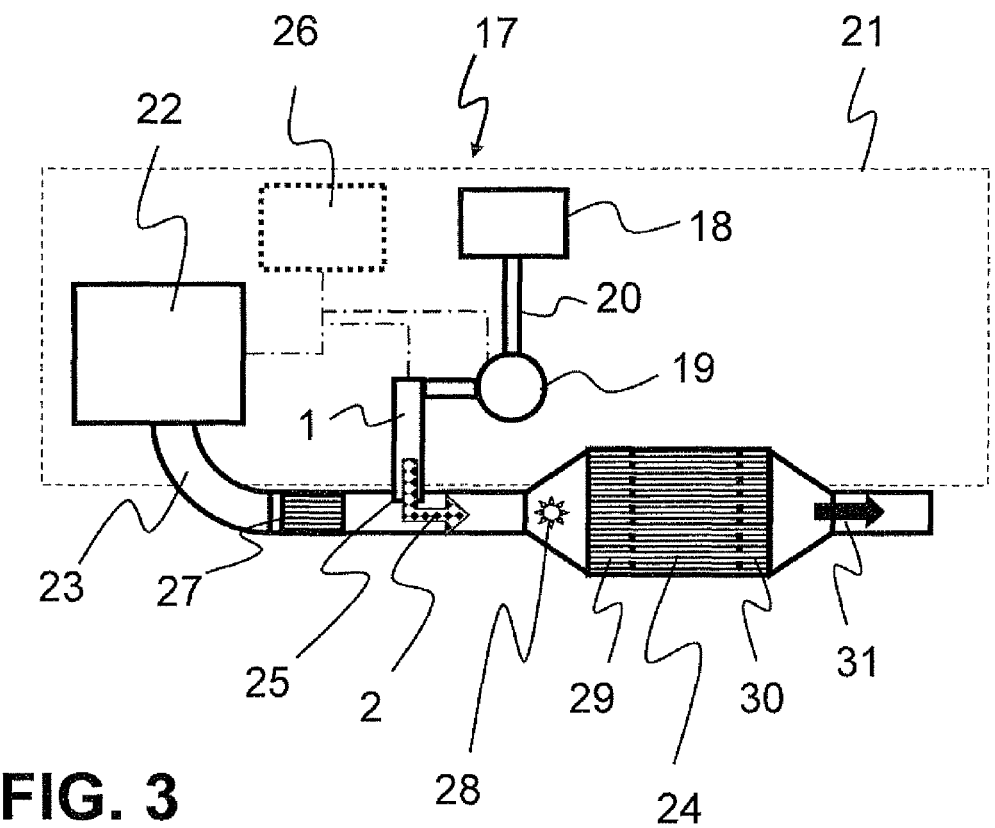
FIG. 3 is a plan view illustrating the structure of an SCR system in a motor vehicle.

FIG. 3 diagrammatically shows a motor vehicle 21, in particular a passenger motor vehicle or a utility motor vehicle. Exhaust gas generated in an internal combustion engine 22 is purified through a corresponding exhaust system 23 and released into the environment. In this case, the exhaust gas flows in the flow direction 31 firstly through a catalytic converter 27 (for example an oxidation catalytic converter) before ultimately impinging further downstream on an SCR catalyst body or catalytic converter body 24. A port or connection 25 for the evaporation unit 1 according to the invention is provided between the catalytic converter 27 and the SCR catalyst body 24 in such a way that a gas flow 2 including ammonia is conducted or led in at the port 25. The ammonia-laden exhaust-gas flow then arrives, if appropriate, at a flow manipulator 28 (for example a static mixer) before the mixture arrives at the SCR catalyst body 24. For the sake of completeness, it is pointed out that the SCR catalytic converter may be provided in an inlet region 29 and/or in an outlet region 30 with further exhaust-gas treatment components such as, for example, a particle separator in the inlet region 29 and/or an oxidation catalytic converter in the outlet region 30. It is likewise pointed out that other exhaust-gas treatment devices may also be provided in the exhaust system 23.

The evaporation unit 1 according to the invention is connected through a plurality of line sections 20 to a reservoir 18. A liquid urea-water solution which is, for example, provided in the reservoir 18, is then supplied to the evaporation unit 1 according to time and/or volume, through the use of a dosing pump 19. For this purpose, the dosing pump 19, the evaporation unit 1 and/or the internal combustion engine 22 may be connected (in data-transmitting fashion and/or operatively) to a controller 26 in order to ensure a respective regulated admixture of urea-water solution to the evaporation unit and ammonia gas to the exhaust gas in this case.

Merely for the sake of completeness, it is also pointed out in this case that a device 17 including at least one reservoir 18, a line section 20, a dosing pump 19 and an evaporation unit 1, may also be constructed and marketed separately in any desired quantities as a component set, with or without a controller 26.

Figure 4:
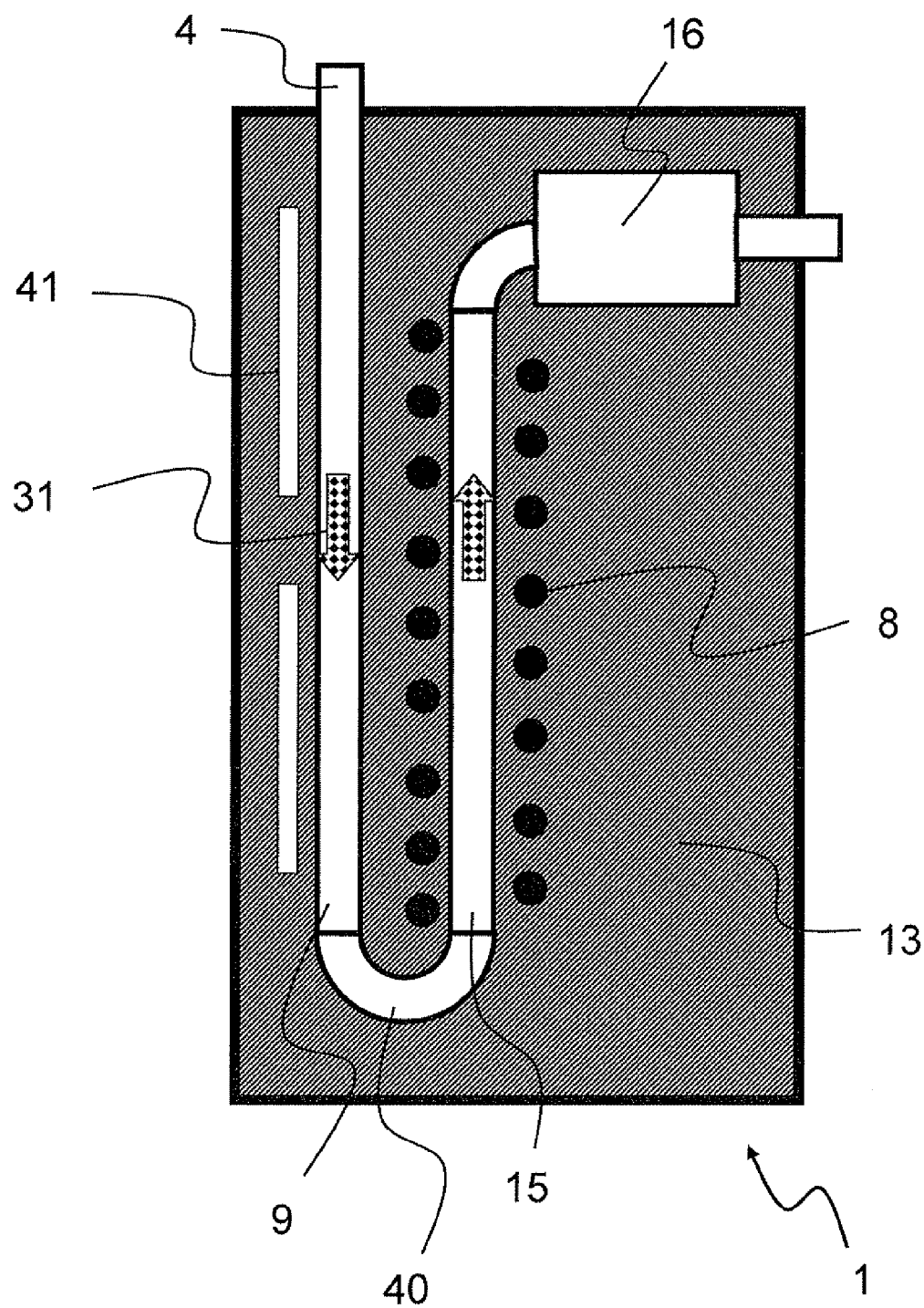
FIG. 4 is a longitudinal-sectional view of an evaporation unit.

FIG. 4 diagrammatically shows a structural variant having an evaporation unit 1 with a basic body 13 which is illustrated in section. The flow channel 4, which is provided in the basic body 13, extends initially in a direction leading into the basic body 13. A plurality of PTC elements 41 for electrically heating the flow channel 4 or the gas/liquid mixture flowing therein in the flow direction 31, is provided on one side of the flow channel 4. This region then forms a first evaporation section 9. A turning section 40, in which the flow direction 31 is turned or reversed through 180°, adjoins the first evaporation section 9. A second evaporation section 15 adjoins the turning section 40. A coaxial heat conductor 8 is provided around this section of the flow channel 4. Before the gas flow then leaves the evaporation unit again, the gas is also conducted through a reactor chamber 16 in order to further promote the production of ammonia. In the configuration proposed herein, it is possible in particular to obtain heat exchange effects between the first evaporation section 9 and the second evaporation section 15, thereby providing an energetically expedient construction.

Figure 5:
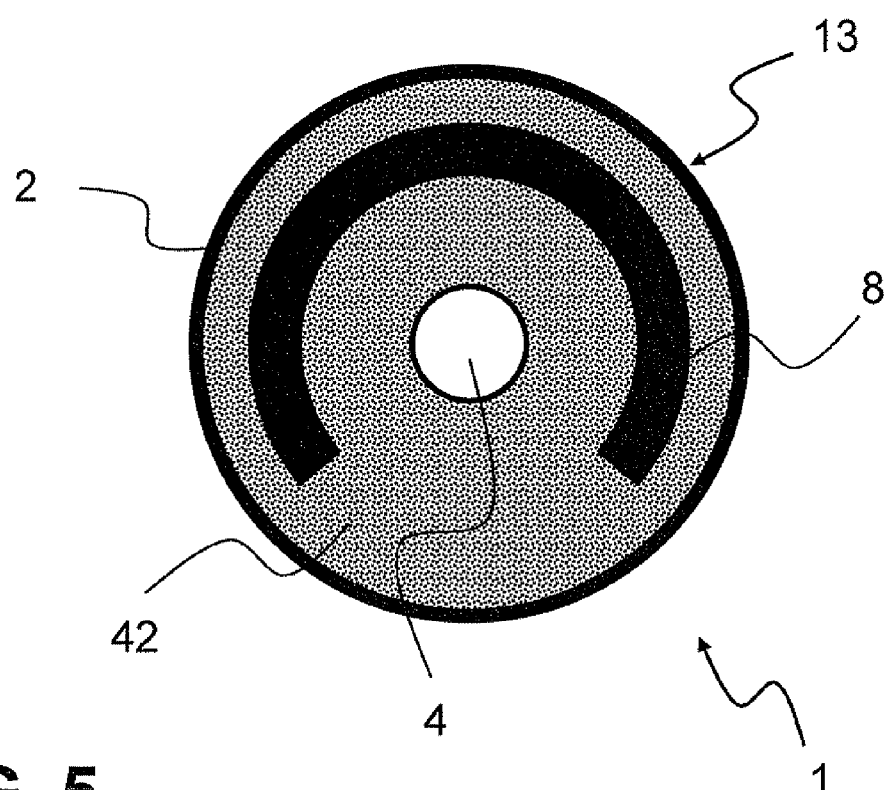
FIG. 5 is a cross-sectional view of a further structure of an evaporation unit with copper granulate.

FIG. 5 diagrammatically shows a further embodiment of an evaporation unit 1 in a cross section. The evaporation unit 1 has a housing 2 in the form of a tube, with the flow channel 4 being disposed centrally and with a heat conductor 8 being disposed coaxially with respect to the flow channel 4. The flow channel 4 and the heat conductor 8 are surrounded with copper granulate 42, in such a way that heat transfer can take place through the use of corresponding contact between the copper granulate 42 and the flow channel 4 on one hand and between the copper granulate 42 the heat conductor 8 on the other hand. For this purpose, the copper granulate 42 disposed between the flow channel 4 and the heat conductor 8 is, in particular, compacted.

The invention claimed is:

1. An evaporation unit for producing a gas flow including ammonia, the evaporation unit comprising:
   a central axis;
   a housing formed by steel material;
   at least one meandering flow channel having an inlet, an outlet, a first evaporation section and a closed wall delimiting and forming said at least one flow channel;
   said closed wall being formed by a tube including titanium;
   said at least one meandering flow channel having a periodic change in profile about said central axis;
   at least one heat conductor disposed at least in said first evaporation section of said at least one flow channel coaxially between said housing and said wall; and
   a basic body including at least aluminum or copper;
   at least said at least one flow channel or said at least one heat conductor being cast into said basic body causing said at least one heat conductor to be spaced apart from said housing and said at least one flow channel at least in said first evaporation section.

2. The evaporation unit according to claim 1, wherein said wall is at least partially provided with a hydrolysis coating.

3. The evaporation unit according to claim 1, which further comprises a basic body including copper granulate, at least said at least one flow channel and said at least one heat conductor being disposed in said basic body.

4. The evaporation unit according to claim 1, which further comprises at least one thermal insulation disposed between said housing and said at least one heat conductor.

5. The evaporation unit according to claim 4, which further comprises:
   a second evaporation section in addition to said first evaporation section; and
   a basic body disposed between said housing and said at least one meandering flow channel;
   at least one of said at least one meandering flow channel, said at least one heat conductor, said wall, said basic body or said insulation varying in at least a configuration, number or construction thereof.

6. The evaporation unit according to claim 1, which further comprises a second evaporation section in addition to said first evaporation section, said first evaporation section and said second evaporation section being mutually parallel and interconnected by a turning section.

7. The evaporation unit according to claim 1, which further comprises at least one reactor chamber with a hydrolysis coating disposed adjacent said outlet of said at least one flow channel.

8. The evaporation unit according to claim 1, which further comprises:
   a second evaporation section in addition to said first evaporation section:
   said at least one meandering flow channel differing in at least one of a number of flow channels, a profile shape, a material forming said flow channels or a cross section of said flow channels.

9. The evaporation unit according to claim 1, which further comprises:
   a second evaporation section in addition to said first evaporation section:
   said at least one heat conductor differing in at least one of a number of said heat conductors, a spacing between said heat conductors and said flow channel or said housing.

10. The evaporation unit according to claim 1, which further comprises:
    a second evaporation section in addition to said first evaporation section:
    said at least one heat conductor differing in a number of said heat conductors, a spacing between said heat conductors and said flow channel or said housing.

11. The evaporation unit according to claim 1, wherein said at least one heat conductor is positioned closer to said housing at one point and closer to said flow channel at another point.

12. The evaporation unit according to claim 4, wherein:
    said at least one thermal insulation is formed by a ceramic layer formed with a ceramic powder and positioned adjacent said basic body; and
    a ceramic tube is provided further outward, between said ceramic layer and said housing.

13. The evaporation unit according to claim 1, which further comprises:
    a second evaporation section in addition to said first evaporation section; and
    a thermal insulation formed by a gap in axial direction between said first evaporation section and said second evaporation section.

14. The evaporation unit according to claim 1, which further comprises:
    a widening of said basic body in vicinity of said outlet of said at least one meandering flow channel:
    a reactor chamber following said widening: and a honeycomb body having a hydrolysis coating in said reactor chamber.

15. The evaporation unit according to claim 1, wherein said tube including titanium has a wall forming a corrugated structure, and said tube has a diameter of less than 6 mm.

16. A device, comprising:
at least one reservoir;
a dosing pump;
an evaporation unit according to claim 1; and
at least one line section at least partially interconnecting said at least one reservoir, said dosing pump and said evaporation unit.

17. A motor vehicle, comprising:
an internal combustion engine; and
an evaporation unit according to claim 1
an exhaust system having at least one SCR catalyst body and at least one connection to said evaporation unit;
said at least one connection disposed between said internal combustion engine and said at least one SCR catalyst body for conducting gaseous ammonia into said exhaust system and to said at least one SCR catalyst body.

18. A motor vehicle, comprising:
an internal combustion engine; and
the device according to claim 16
an exhaust system having at least one SCR catalyst body and at least one connection to said device;
said at least one connection disposed between said internal combustion engine and said at least one SCR catalyst body for conducting gaseous ammonia into said exhaust system and to said at least one SCR catalyst body.

* * * * *